US012502986B2

(12) United States Patent
Haas et al.

(10) Patent No.: US 12,502,986 B2
(45) Date of Patent: Dec. 23, 2025

(54) COOLING DEVICE FOR A TRACTION BATTERY OF A VEHICLE

(71) Applicant: KAUTEX TEXTRON GmbH & Co. KG, Bonn (DE)

(72) Inventors: Felix Haas, Bonn (DE); Moritz Lipperheide, Bonn (DE); Hartmut Wolf, Konigswinter (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 852 days.

(21) Appl. No.: 17/769,528

(22) PCT Filed: Oct. 15, 2020

(86) PCT No.: PCT/EP2020/078982
§ 371 (c)(1),
(2) Date: Apr. 15, 2022

(87) PCT Pub. No.: WO2021/074263
PCT Pub. Date: Apr. 22, 2021

(65) Prior Publication Data
US 2024/0131937 A1   Apr. 25, 2024
US 2024/0227582 A9   Jul. 11, 2024

(30) Foreign Application Priority Data

Oct. 17, 2019 (DE) .......................... 102019216052.2

(51) Int. Cl.
*H01M 10/6569* (2014.01)
*B60K 1/04* (2019.01)
(Continued)

(52) U.S. Cl.
CPC ................ *B60L 50/66* (2019.02); *B60K 1/04* (2013.01); *B60K 11/02* (2013.01);
(Continued)

(58) Field of Classification Search
CPC ... B60L 50/66; H01M 10/613; H01M 10/625; H01M 10/63; H01M 10/6569; H01M 10/663; H01M 10/6568; H01M 10/6552
See application file for complete search history.

(56) References Cited

U.S. PATENT DOCUMENTS 5,333,677 A * 8/1994 Molivadas .............. F03G 6/067
123/41.26
6,106,972 A * 8/2000 Kokubo .................. B60L 58/26
429/120
(Continued)

FOREIGN PATENT DOCUMENTS

CN   104553750   4/2015
CN   105895992   8/2016
(Continued)

OTHER PUBLICATIONS

Chinese Office Action from corresponding Chinese Patent Application No. 202080072201.6 dated Apr. 26, 2023, 8 pages.
(Continued)

*Primary Examiner* — Steve Clemmons
(74) *Attorney, Agent, or Firm* — Lee & Hayes, P.C.

(57) ABSTRACT

A cooling device for cooling a traction battery of a vehicle by means of a fluid. The device includes an evaporation device for installing in a housing body of the traction body, at least one condensation device for installing on the vehicle outside of the housing body of the traction battery, and connection lines which conduct fluid evaporated in the evaporation device to the at least one condensation device and condensed fluid from the at least one condensation device back to the evaporation device. The evaporation device, the at least one condensation device, and the connection lines form a first cooling circuit. The first cooling circuit is designed in the form of a natural circulation. The circulation of the fluid through the first cooling circuit
(Continued)

Figure 1:
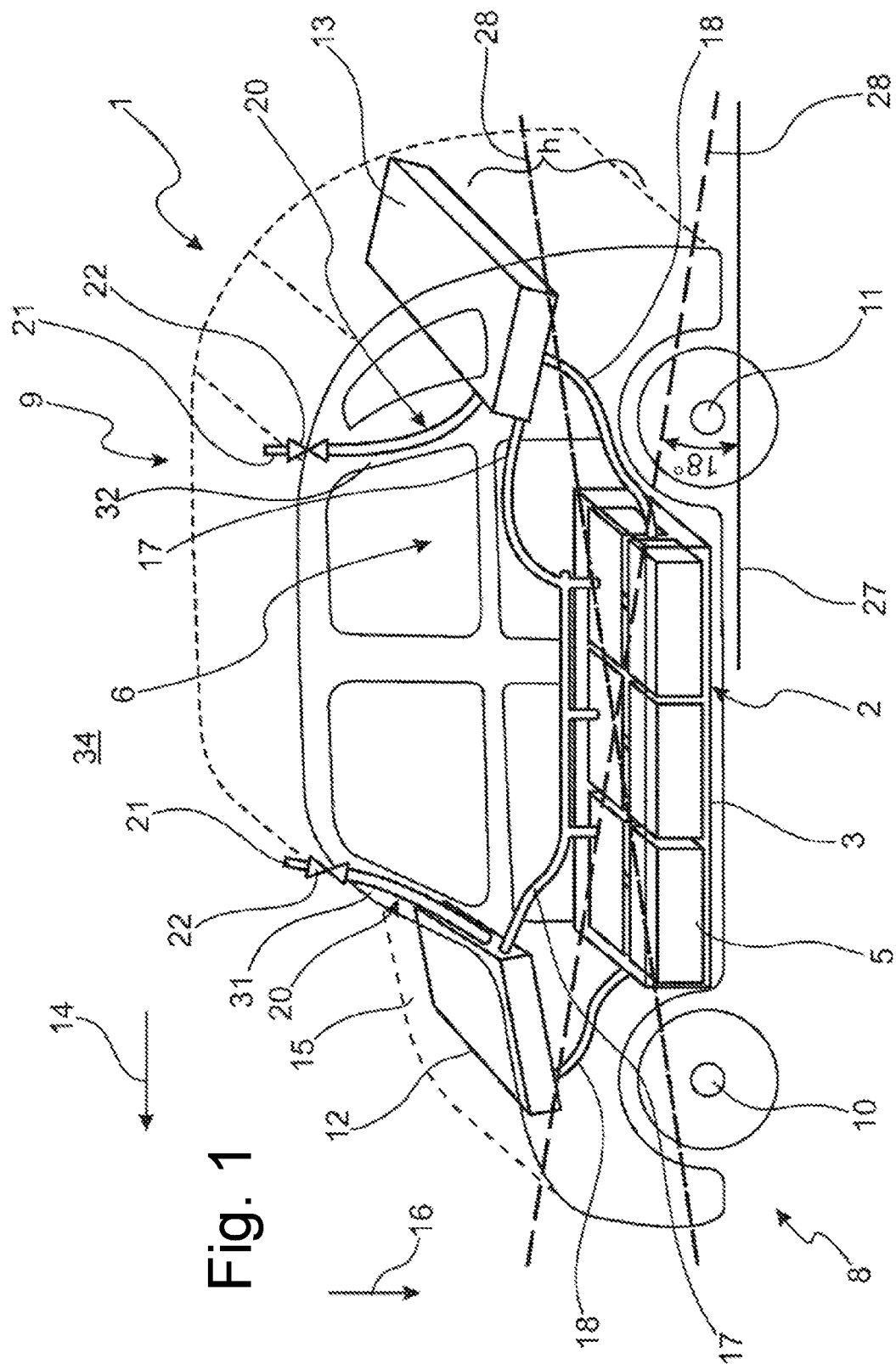

includes the process of transporting gaseous fluid from the evaporation device to the at least one condensation device and liquid fluid from the at least one condensation device back to the evaporation device, and during operation the circulation is carried out on the basis of a difference in the density of the fluid evaporated in the evaporation device and the fluid condensed in the at least one condensation device and on the basis of a difference in the height of the at least one condensation device and the evaporation device.

16 Claims, 7 Drawing Sheets

(51) Int. Cl.

| | | |
|---|---|---|
| *B60K 11/02* | (2006.01) | |
| *B60L 50/60* | (2019.01) | |
| *H01M 10/613* | (2014.01) | |
| *H01M 10/625* | (2014.01) | |
| *H01M 10/63* | (2014.01) | |
| *H01M 10/663* | (2014.01) | |
| *B60K 1/00* | (2006.01) | |

(52) U.S. Cl.
CPC ....... *H01M 10/613* (2015.04); *H01M 10/625* (2015.04); *H01M 10/63* (2015.04); *H01M 10/6569* (2015.04); *H01M 10/663* (2015.04); *B60K 2001/005* (2013.01); *B60K 2001/0438* (2013.01); *H01M 2220/20* (2013.01)

(56) References Cited

U.S. PATENT DOCUMENTS

| | | | | |
|---|---|---|---|---|
| 9,865,907 | B2 * | 1/2018 | Xiang | H01M 10/6563 |
| 10,288,330 | B2 * | 5/2019 | Schon | F25B 39/00 |
| 10,950,909 | B2 * | 3/2021 | Miura | H01M 10/6569 |
| 10,996,002 | B2 * | 5/2021 | Omi | H01M 10/6556 |
| 10,998,590 | B2 * | 5/2021 | Harris | H01M 10/6554 |
| 11,029,098 | B2 * | 6/2021 | Takeuchi | H01M 10/647 |
| 11,433,736 | B2 * | 9/2022 | Sathasivam | B60H 1/00878 |
| 2018/0272834 | A1 * | 9/2018 | Hahn | H01M 10/6568 |
| 2019/0198954 | A1 * | 6/2019 | Miura | H01M 10/613 |
| 2019/0363411 | A1 * | 11/2019 | Takeuchi | H01M 10/6552 |
| 2020/0088471 | A1 * | 3/2020 | Omi | H01M 10/653 |
| 2020/0096260 | A1 | 3/2020 | Omi et al. | |
| 2020/0254845 | A1 * | 8/2020 | Miura | B60H 1/32281 |
| 2021/0280925 | A1 * | 9/2021 | Yoshinori | H01M 10/6569 |

FOREIGN PATENT DOCUMENTS

| | | | | |
|---|---|---|---|---|
| CN | 2016186900 | | 10/2016 | |
| DE | 4441162 | | 6/1996 | |
| DE | 19829293 | | 1/1999 | |
| DE | 112017005160 | | 7/2019 | |
| GB | 2295264 A | * | 5/1996 | ......... B60H 1/00278 |
| JP | 5942943 B2 | * | 6/2016 | ......... B60H 1/00278 |
| JP | 2018179489 | | 11/2018 | |
| JP | 2018179489 A | * | 11/2018 | ............... B60K 1/04 |
| JP | 2019052837 A | * | 4/2019 | ............... F25D 9/00 |
| WO | WO2018070115 | | 4/2018 | |
| WO | WO2018163180 | | 9/2018 | |
| WO | WO2018186179 | | 10/2018 | |
| WO | WO-2019039129 A1 | * | 2/2019 | ............ F28D 15/02 |
| WO | WO2019039187 | | 2/2019 | |
| WO | WO-2019039187 A1 | * | 2/2019 | |
| WO | WO2019058805 | | 3/2019 | |
| WO | WO-2020218007 A1 | * | 10/2020 | |

OTHER PUBLICATIONS

PCT Search Report for corresponding PCT Application No. PCT/EP2020/078982 dated Dec. 11, 2020, 5 pages.

* cited by examiner

COOLING DEVICE FOR A TRACTION BATTERY OF A VEHICLE

This Application claims priority to PCT Application No. PCT/EP2020/078982, filed Oct. 15, 2020, which claims priority to DE Patent Application No. 10 2019 216 052.2, filed Oct. 17, 2019, the contents of each of which is incorporated herein by reference.

The present invention relates to a cooling device for cooling a traction battery of a vehicle by means of a fluid, comprising an evaporation device for installing in a housing body of the traction battery, at least one condensation device for installing on the vehicle outside of the housing body of the traction battery, and connection lines, which conduct fluid evaporated in the evaporation device to the at least one condensation device and condensed fluid from the at least one condensation device back to the evaporation device.

The present invention also relates to an electrically drivable vehicle with a traction battery and the above cooling device.

Various types of high-performance batteries are known from the prior art. In high-performance batteries such as those used, for example, as traction batteries in vehicles with electric drives, high levels of power are converted during the charging and discharging process. Such high-performance batteries can currently be operated with voltages of up to several hundred volts or even up to 1000 volts. In addition, the charging and discharging of currents of several hundred amperes up to 1000 amperes can currently occur. In principle, higher voltages and currents are also possible in future developments.

In the high-performance batteries, the strong charging and discharging currents cause significant thermal losses which cause the high-performance batteries to heat up. In order to protect the batteries from thermal damage and to achieve high efficiency, it is important to keep the high-capacity battery within a desired temperature range. In order to avoid exceeding the temperature range, heat must be removed from the batteries. This is all the more important, the stronger the currents and the associated greater thermal losses, so that the batteries remain in the desired temperature range even with such large currents. The current battery cells using lithium-ion technology work best in a narrow temperature range of, for example, 15° to 40° C. with a great temperature homogeneity and a temperature fluctuation of 2 to 4° C. within and between the battery cells. A reliable operation of the high-performance batteries and a long service life with consistent performance can be achieved under such conditions.

In order to ensure these conditions and to avoid exceeding the temperature range, the battery cells of the current high-performance batteries are cooled during operation, i.e., during the charging and/or discharging process. Different types of cooling are currently used. For example, liquid cooling involves a heat exchanger through which a liquid heat transport medium flows. The heat exchanger is usually arranged below the battery cells, with the heat exchanger being thermally conductively connected to the battery cells via a contact heat transfer. The heat capacity of the liquid heat transport medium is used to absorb the heat emitted by the battery cells or the battery as a whole via a temperature difference and to either release it into the environment either directly or via an air conditioning circuit. Water or a likewise electrically conductive water-glycol mixture is used as the heat transport medium, for example, which is why a reliable separation of the heat transport medium from the battery cells is required.

A similar cooling can also be realized with air as the heat transport medium. Since air, unlike water, is not electrically conductive, the battery cells can be in direct contact with the heat transport medium and, for example, be overflown by it. A heat exchanger is therefore not absolutely necessary.

In the systems currently available, the heat transport medium circulates actively in order to dissipate the heat dissipated by convection. In an active circulation, the heat transport medium is actively circulated in order to dissipate the heat from the battery cells.

As a further development of a liquid cooling process with a heat exchanger that is in contact with the battery cells, the liquid heat transport medium can be evaporated by the heat absorption from the heat exchanger, which leads to a higher heat transfer and, due to the evaporation enthalpy, to a high heat absorption per mass of the heat transport medium. After a condensation, the heat transport medium can be returned to the heat exchanger in the liquid state.

There are also some cooling systems in development with a liquid heat transport medium, for example in industrial applications for high-voltage traction batteries, that do not have a heat exchanger that is in contact with the battery cells. Comparable to the use of air as a heat transport medium, the cooling takes place via a direct flow of the liquid heat transport medium around the components to be cooled. An important property of the liquid heat transport medium is therefore its dielectricity, since the heat transport medium is in direct contact with the battery cells, i.e., with electrically conductive and potential-carrying components. In addition, the evaporation enthalpy of the dielectric, liquid heat transport medium and the associated high heat transfer can also be used if the heat transport medium evaporates during the heat transfer due to the heat input from the battery cells to be cooled. Such cooling is referred to as two-phase immersion cooling.

In such systems with an active circulation, both the weight and the energy consumption are increased by additional units such as compressors or pumps. In addition, in the event of a power failure in the vehicle, the battery cells are not cooled, which is problematic in particular in connection with a previous high-power output and can lead to a heat build-up.

The object of the present invention is to provide a cooling device for cooling a traction battery of a vehicle with a fluid and a vehicle with such a cooling device, which efficiently cools the battery cells of the traction battery with a low weight and a high reliability.

The problem addressed by the present invention is solved by a cooling device having the features of claim 1. Advantageous embodiments of the cooling device are described in claims 2 to 10, which are dependent on claim 1.

More specifically, the problem on which the present invention is based is solved by a cooling device for cooling a traction battery of a vehicle by means of a fluid, comprising an evaporation device for installing in a housing body of the traction battery, at least one condensation device for installing on the vehicle outside of the housing body of the traction battery, and connection lines which conduct fluid evaporated in the evaporation device to the at least one condensation device and condensed fluid from the at least one condensation device back to the evaporation device.

The cooling device according to the invention is characterized in that the evaporation device, the at least one condensation device and the connection lines form a first cooling circuit, said cooling circuit being designed in the form of a natural circulation, with the circulation of the fluid through the first cooling circuit transporting gaseous fluid from the evaporation device to the at least one condensation device and liquid fluid from the at least one condensation device back to the evaporation device, and during operation the circulation is carried out on the basis of a difference in the density of the fluid evaporated in the evaporation device and the fluid condensed in the at least one condensation device and on the basis of a difference in the height of the at least one condensation device and the evaporation device.

The problem addressed by the present invention is also solved by a vehicle having the features of claim 11. Advantageous embodiments of the vehicle are described in claims 12 to 16, which are dependent on claim 11.

In more detail, the problem that the present invention is based on is likewise solved by an electrically drivable vehicle comprising a traction battery and a cooling device as referenced above, wherein the traction battery with its housing body and the evaporation device installed therein is installed in a floor region of the vehicle, wherein the at least one condensation device is installed outside of the traction battery in a region above the evaporation device, and a fluid is contained in the cooling device.

The cooling device according to the invention thus forms a cooling circuit in the vehicle in which the fluid circulates passively without a circulation device between the evaporation device and the at least one condensation device. By dispensing with the circulation device, the cooling device can be operated practically maintenance free since active components which could fail are dispensed with, thus increasing the operational reliability of the traction battery and thus the vehicle. The cooling device designed according to the invention is inexpensive and has a low weight as well. Due to the passive cooling circuit, there is no need to actively transport fluid. This has the advantage that the cooling device can also be cooled without using the vehicle. The traction battery can, for example, be cooled with the cooling device not only when charging at a charging station but also after the end of the charging process without the vehicle having to be active, for example for driving purposes. Thus, heat remaining in the traction battery after operation, i.e., after charging the traction battery or after driving the vehicle, can continue to be dissipated.

In the cooling device according to the invention, the fluid circulates passively in the first cooling circuit. The cooling device is thus designed in the manner of a thermosiphon. A thermosiphon is a passive structure that allows for a heat exchange by utilizing natural convection in a vertical fluid circuit between the evaporation device and the at least one condensation device. The function of the thermosiphon is based on a difference in the density of the liquid and the gaseous phase of the fluid. When the heat is absorbed by the battery cells of the traction battery, the initially liquid fluid evaporates in the evaporation device. As a result, the gaseous fluid in the connection lines flows, due to its low density and without a circulation device, to the at least one condensation device, which is arranged above the evaporation device. In the at least one condensation device, the gaseous fluid releases the previously absorbed heat to the environment and condenses. From there, the condensed fluid flows back into the housing body due to gravity and the difference in height between the at least one condensation device and the evaporation device, where it is again made available to the evaporation device. A plenum with liquid fluid is formed in the housing body of the traction battery, from where the liquid fluid re-enters the evaporation device.

With a vertical arrangement of a vapor-filled riser and a liquid-filled downcomer, different pressures prevail at the bottom of the two pipes due to the difference in the density of the vapor column and the liquid column. If the riser and the downcomer are connected at the bottom, pressure equalization is achieved by liquid fluid flowing from the downcomer towards the vapor column in the riser. During the evaporation and further heating of the fluid, the concentration of the gaseous fluid in the evaporation device increases. Due to a continuous evaporation of the liquid fluid at the bottom of the riser or in the evaporation device and a condensation of the gaseous fluid at the top end of the riser or in the at least one condensation device and the subsequent return of the condensed fluid to the downcomer, the cycle is closed and generates a dynamic circulation in the cooling device.

An efficient cooling device can be provided by the two-phase cooling. In the two-phase cooling, the liquid fluid in the evaporation device absorbs heat from the battery cells so that it evaporates and dissipates heat in the at least one condensation device to an environment of the vehicle, as a result of which the gaseous fluid condenses again. As a result, the fluid can circulate in the cooling device in the manner of a cooling circuit, wherein the fluid absorbs evaporation heat during the evaporation which it releases again during the condensation from its gaseous state. The evaporation heat is high in terms of its absolute value and thus achieves a high cooling capacity of the cooling device.

The evaporation device can be installed as a separate body in the housing body of the traction battery. Alternatively, the evaporation device can be permanently installed in the housing body.

The at least one condensation device is arranged outside of the housing body of the traction battery in order to be able to provide a sufficient difference in height to the evaporation device. A condensation device may be provided. In one configuration of the cooling device with a plurality of condensation devices, these can be arranged so that they are distributed on the vehicle in a suitable manner in order to collectively provide a required overall size for condensing the gaseous fluid. This also facilitates the installation on the vehicle since the condensation devices can be easily adapted to a design of the vehicle and can utilize free space in the vehicle. A plurality of condensation devices is preferably connected in parallel to the evaporation device via parallel connection lines. In principle, a plurality of condensation devices can also be arranged in series and connected to the evaporation device. A combination of these is principally possible as well.

The condensation device usually dissipates the heat absorbed by the gaseous fluid to the environment, i.e., to the ambient air, during the condensation. When the vehicle is driven, enough ambient air is usually introduced by its movement to cause sufficient heat dissipation from the condensation device to the environment. The heat dissipation can be improved by an active supply of ambient air, for example by a ventilation device, and can, in particular, also be ensured without the vehicle moving. The at least one condensation device is arranged outside of the housing body of the traction battery in order to ensure good cooling by the ambient air. The cooling device may only comprise one condensation device. In one configuration of the cooling device with a plurality of condensation devices, these can be distributed or jointly arranged on the vehicle in a suitable manner in order to collectively provide a required overall size for condensing the gaseous fluid. A distributed installation of the condensation devices facilitates the installation on the vehicle because the condensation devices can be easily adapted to a design of the vehicle and can utilize free space in the vehicle.

The connection lines connect the evaporation device and the at least one condensation device. In principle, the liquid fluid and the gaseous fluid can also flow at least partially through a common connection line. Advantageously, each condensation device is connected to two connection lines, a riser for the transport of gaseous fluid to the condensation device and a downcomer for the return transport of the liquid fluid. By connecting the evaporation device and the at least one condensation device via the connection lines, a corresponding fluid circuit is formed as the first cooling circuit in order to dissipate heat from the battery cells of the traction battery and release it to the environment.

The battery cells can be accommodated individually or as units/blocks/modules with a plurality of battery cells in the housing body of the traction battery. For this purpose, the housing body can have suitable receiving positions in which the battery cells are received individually or in groups or as a battery module.

The evaporation device is a heat exchanger in which heat is transferred from the battery cells of the traction battery to the liquid fluid so that it can evaporate. Such an evaporation device is also known as a vaporizer. The condensation device is also a heat exchanger that absorbs heat from the gaseous fluid and releases it to an environment so that the gaseous fluid condenses. Such a condensation device is also known as a vapor condenser or liquefier.

The fluid is a heat transfer medium and preferably has a boiling temperature of 10° C. to 80° C. at ambient pressure. A maximum cooling effect is achieved by evaporating the fluid, which is why a low boiling point is advantageous. The boiling temperature of the fluid is preferably lower than a maximum operating temperature of the battery cells. Due to a boiling at these temperatures even at ambient pressure, i.e., at usually about one bar, a passive cooling process can be carried out efficiently using the specified cooling device.

The traction battery is preferably a high-performance battery that can be operated with voltages of up to several hundred volts or even up to 1000 volts and charging and discharging currents of several hundred amperes up to 1000 amperes. In principle, higher voltages and currents are also possible in future developments. In order to protect the high-performance battery from thermal damage and to achieve high efficiency, the traction battery is kept within a desired temperature range. The current battery cells of such traction batteries are, for example, produced by using lithium-ion technology and work best in a narrow temperature range of, for example, 15° to 40° C. with a great temperature homogeneity and a temperature fluctuation of 2-4° C. within and between the battery cells.

In principle, the vehicle is any vehicle with an electric drive. The vehicle can comprise only an electric drive or, as a so-called hybrid vehicle, a combination of different types of drives.

In one advantageous embodiment, the evaporation device is arranged in a vertical direction below the at least one condensation device. A natural gradient is ensured between the at least one condensation device and the evaporation device so that condensed fluid can flow from the at least one condensation device to the evaporation device by means of gravity. In addition, the evaporated fluid can easily rise from the evaporation device to the at least one condensation device.

In one advantageous embodiment, the first cooling circuit comprises a plurality of condensation devices, and the plurality of condensation devices is designed for a distributed installation on the vehicle, in particular in front of and behind the evaporation device in the longitudinal direction of the vehicle. The cooling device can be designed to be particularly reliable due to the plurality of condensation devices. First of all, the cooling capacity of the cooling device can be increased when using a plurality of condensation devices. In addition, the plurality of condensation devices can, due to its distribution, ensure that, for example, regardless of the inclination of the vehicle, at least one of the condensation devices is always advantageously positioned relative to the evaporation device so that the gaseous fluid can condense and the condensed fluid can flow back to the evaporation device. If the condensation devices are installed in the longitudinal direction both in front of and behind the evaporation device, i.e., in front of and behind the housing body of the traction battery, at least one of the condensation devices is positioned in such a way that it has an appropriate difference in height relative to the evaporation device to ensure an operation as a thermosiphon.

In one advantageous embodiment, at least one condensation device is designed as a chiller for coupling to an air conditioning system of the vehicle in order to dissipate heat from the first cooling circuit via the air conditioning system. The chiller serves as a controllable heat sink depending on the operation of the vehicle's air conditioning system. As a result, the chiller allows for the cooling device to be operated essentially independently of the ambient temperatures in the vicinity of the vehicle. During operation, the chiller can be used to adjust the cooling capacity of the corresponding condensation device and thus the cooling capacity of the cooling device in general. As a result, for example, an impending load on the traction battery, in particular during a rapid charging with strong currents, can be anticipated by reducing the temperature of the corresponding condensation device. The chiller can thus pre-cool the traction battery before the impending load so that the temperature of the battery cells and the fluid can also be reduced before the load is applied. In addition, the heat output of the at least one condensation device can be increased with the chiller compared to cooling with ambient air so that the at least one condensation device can be reduced in size compared to a cooling with ambient air. The condensation device designed as a chiller can be arranged in parallel or in series with at least one further condensation device.

In one advantageous embodiment, the cooling device comprises a further condensation device and further connection lines to form a second cooling circuit, and the second cooling circuit comprises a circulation device for conveying the fluid in the second cooling circuit. The second cooling circuit is a cooling circuit in which the fluid is actively circulated through the circulation device. For this purpose, the circulation device can comprise a compressor which is arranged in the corresponding further connection line between the evaporation device and the further condensation device and which conveys gaseous fluid into the further condensation device. The gaseous fluid can be compressed, which increases its condensation temperature. Operation in the manner of a heat pump can thus take place in the second cooling circuit. An adjusting throttle for setting a pressure level is preferably additionally provided in the second cooling circuit so that heat can be easily dissipated via the further condensation device even at higher ambient temperatures. Alternatively or additionally, the circulation device can comprise a pump which is arranged in the corresponding further connection line and conveys liquid fluid into the evaporation device. A flow rate in the second cooling circuit can be set by the circulation device. The second cooling circuit allows for the fluid and thus the battery cells to be cooled efficiently, reducing a dependence on ambient conditions, in particular an ambient temperature. In addition, the overall heat dissipation by the cooling device can be increased with the two cooling circuits.

In one advantageous embodiment, the second cooling circuit comprises at least one valve device for a fluidic separation from or connection to the first cooling circuit. This way, the cooling can take place during normal operation exclusively via the first cooling circuit, for example, while the second cooling circuit can also be activated as needed. When the valve device is closed, in particular, the penetration of gaseous fluid into the second cooling circuit is prevented.

Additionally or alternatively, the first cooling circuit can comprise at least one valve device for a fluidic separation from or connection to the first cooling circuit. The first cooling circuit can thus also be activated or deactivated by the corresponding valve device, for example in order to improve the function of the second cooling circuit. The valve device can also be designed as a switching valve with which the cooling device can be switched between an operation with only the first or the second cooling circuit.

In one advantageous embodiment, the cooling device comprises a collector for collecting liquid fluid, wherein the collector is arranged in particular at a connection between the first cooling circuit and the second cooling circuit. The collector is used to collect the liquid fluid. The collector makes it easy to couple the two cooling circuits. In addition, the collector can provide a supply of fluid.

In one advantageous embodiment, the cooling device comprises a control device that is designed to detect an impending load on the traction battery, in particular during rapid charging, which is also designed to pre-cool the traction battery and/or the fluid with the cooling device when an impending load is detected. This makes it possible for the battery cells to be heated by a charging or discharging process over an extended period of time if, for example, the cooling device has a lower cooling capacity than the heat output of the battery cells at maximum current. Such a lower cooling capacity can result from the dimensions of the cooling device and the traction battery, or from fluctuations in the ambient conditions, so that the cooling device temporarily has a reduced cooling capacity compared to its maximum capacity. Control can be exercised, for example, by activating an air conditioning system of the vehicle in the case of one embodiment with at least one condensation device as a chiller of the air conditioning system. Alternatively, the control can act on a second cooling circuit as indicated above. As a further alternative, the control device can supply an increased quantity of ambient air to the outside of the at least one condensation device via a blower.

In one advantageous embodiment, the evaporation device is designed as an immersion evaporation device and comprises at least one evaporation element, wherein microchannels are formed in the at least one evaporation element, or the at least one evaporation element comprises microchannel structures for forming microchannels together with battery cells of the traction battery, or microchannel structures between a plurality of evaporation elements are designed to form microchannels between the evaporation elements and, together with battery cells of the traction battery and the evaporation elements, are arranged in such a way that liquid fluid evaporates in the microchannels while absorbing heat from the battery cells. With immersion cooling, when the battery cells heat up, the heat that is generated can be easily transferred to the fluid, for example via a direct contact of the battery cells with the liquid fluid. This allows for an efficient heat transfer from the battery cells to the fluid. In addition, the traction battery can be provided without a separate heat exchanger between the battery cells and the fluid so that a compact and lightweight traction battery can be provided. The microchannels allow for a highly effective evaporation of the fluid, wherein liquid fluid is entrained by the evaporation of the fluid in the microchannels so that the fluid channels are wetted on the inside. In operation, the fluid channels can be partially filled with liquid fluid. The liquid fluid does not fill the microchannels completely but, for example, at the most up to half, preferably less than 25%. Thus, the quantity of liquid fluid in the traction battery or in the cooling device can be reduced, as a result of which the weight of the cooling device and also of the traction battery is reduced. In principle, it is not necessary for the microchannels to be partially filled with liquid fluid if, for example, the fluid channels are wetted with liquid fluid during operation. For this purpose, for example, a mixture of liquid and gaseous fluid can enter the fluid channels at a vertically lower end or can be formed there. In the configuration of the microchannels in the at least one evaporation element or in the configuration of the at least one evaporation element with microchannel structures to form microchannels together with the battery cells, the evaporation elements can each be arranged independently of one another, for example between adjacent battery cells or on their top sides, for example when using prefabricated battery modules with a plurality of battery cells. In the configuration of the evaporation device with a plurality of evaporation elements, wherein microchannel structures are arranged between the evaporation elements to form microchannels, the evaporation elements are arranged together to form the microchannel structures. Starting from these microchannel structures, the microchannels are formed together with the battery cells. In the last two cases, the microchannel structures are at least partially open toward the battery cells and closed by the battery cells, thus forming the microchannels.

The microchannels are dimensioned in such a way that liquid fluid can flow in from the plenum and vaporized fluid can rise and flow out. The microchannels can have a rectangular, square, trapezoidal, round or oval cross section. The microchannels can, for example, have a diameter or side lengths of less than one centimeter, in particular less than five millimeters, for example around two millimeters. The microchannels are open at their top side so that the evaporated fluid can flow out of the microchannels on the top side.

The fluid that is used in the traction battery and introduced into the housing body is realized here as a dielectric fluid. The dielectric fluid is not electrically conductive so that the individual battery cells are electrically insulated. For the same reasons, the evaporation elements are also preferably made of an electrically nonconductive material.

In one advantageous embodiment, the cooling device, in particular at least one condensation device, comprises a pressure compensation device for pressure compensation between an interior of the cooling device and an external environment. The pressure in the cooling device can range by several bars from a negative pressure to a positive pressure, for example depending on the fluid used. The cooling device can thus be aerated when a negative pressure arises therein; i.e., an aeration gas, for example a gas mixture such as ambient air or even a specially supplied individual gas such as nitrogen, is fed in and causes the pressure in the cooling device to increase. Alternatively or additionally, the cooling device can be ventilated when exposed to positive pressure, i.e., a ventilation gas is released, as a result of which the pressure in the cooling device drops. The ventilation gas is preferably previously received aeration gas, although in practice gaseous fluid will also be comprised in the ventilation gas.

The pressure equalization can bring about various advantages for the cooling circuit and the traction battery. A negative pressure formed in the cooling device and thus in the traction battery can be reduced by the aeration. Consequently, critical negative pressures in the cooling device and thus in the traction battery can be avoided. Accordingly, the requirements for a low-pressure-stable configuration of the housing body, of the traction battery or also of the cooling device can be reduced, as a result of which a degree of complexity thereof is reduced during manufacture. In principle, the aeration can take place at any point in the interior of the cooling circuit. The interior is, in principle, any part of the cooling circuit through which the fluid flows and includes an interior of the at least one condensation device.

The ventilation preferably comes from the condensation device in which gaseous fluid collects for condensation. This makes it possible to discharge aeration gas from a previous aeration from the cooling cycle as ventilation gas. The aeration gas usually has a lower boiling temperature than the fluid. The ventilation required for releasing the aeration gas ensures a high efficiency of the cooling circuit and sufficient cooling of the traction battery, wherein preferably only aeration gas that was previously supplied is discharged during the ventilation process. Phase transitions of the fluid in the cooling device can easily be achieved, in particular during the condensing process in the condensation device, when there is/are no gas or as few gases as possible other than the gaseous fluid in the cooling device. After the aeration with the aeration gas, the aeration gas mixes with the gaseous fluid in the cooling device to form a gas mixture. As a result, the heat transfer is fundamentally worsened, particularly in the condensation device. Correspondingly, ventilation can be carried out via the pressure compensation device by the release of ventilation gas. Preferably, the aeration gas taken up during the previous aeration is released during the ventilation process in order to increase the concentration of the gaseous fluid in the cooling circuit. In principle, however, gaseous fluid or a mixture of gaseous fluid and the aeration gas can also be released as ventilation gas.

In order to control the pressure compensation, the pressure compensation device preferably comprises a controllable pressure compensation valve. For example, the pressure compensation valve can open when the pressure in the cooling device falls below a pressure limit, for example below 0.8 bar. The ambient air is preferably dried by a drying device, for example by a replaceable drying cartridge, as it flows in via the pressure equalization device. The ingress of moisture into the condensation device and above it into the cooling circuit is minimized. The moisture, i.e., usually water, is in principle electrically conductive so that a mixture of the moisture with the fluid has a lower dielectric constant and a higher electrical conductivity than the fluid alone, which can lead to damage to the traction battery due to an electrical short circuit.

Due to the aeration gas in the cooling device, a higher pressure level is reached in the cooling device when the fluid is heated than would be the case with a pure fluid, and the heat transfer in the at least one condensation device is fundamentally worsened. Correspondingly, the cooling device can be ventilated via the pressure compensation device. Measures are preferably taken to prevent the gaseous fluid from escaping and to correspondingly increase the concentration of the gaseous fluid in the interior of the cooling device. For this purpose, the pressure equalization device can be designed in the manner of a chimney, at the upper end of which the pressure equalization valve is located. In the chimney, there is a material separation due to the difference in density between the gaseous fluid and the other gases, in particular the ambient air that was previously taken in. Alternatively or additionally, the pressure compensation device includes a filter device that comprises an activated carbon filter, a zeolite material, a filter membrane, a chemical filter or any combination of a plurality of these filter elements. The zeolite material is preferably designed such that it has a higher adsorption of the gaseous fluid at a maximum pressure in the cooling device and an associated system temperature than at a minimum pressure and an associated system temperature. To support this, the zeolite material can be actively tempered during the ventilation process. The membrane filter retains the gaseous fluid from the gas mixture due to the different molecular sizes when the interior is ventilated. Any remaining ventilation gas is typically ambient air with its main components $N_2$ and $O_2$ in a small molecular size, i.e., with a small particle size compared to a molecular fluid with a complex molecular structure, so that the remaining ventilation gas can pass through the membrane filter and only the gaseous fluid is retained. Such a membrane filter has, in particular, a pore structure through which the ventilation gas, but not the gaseous fluid, can pass. The chemical filter filters the fluid by adsorption.

The filter device is preferably discharged again during operation by actively supplying heat, as a result of which the fluid contained therein is recovered. Alternatively or additionally, the ventilation gas can be actively cooled during the ventilation process so that the gaseous fluid contained therein is condensed and only the remaining ambient air escapes. The condensed fluid can then, in the liquid state, be returned from the pressure compensation device to the first cooling circuit so that only minor fluid losses occur when the cooling device is ventilated. The pressure compensation device is preferably arranged in an A pillar or a C pillar of the vehicle, i.e., at the front or rear end of the passenger compartment.

In one advantageous embodiment, the traction battery with its housing body and the evaporation device installed therein is arranged underneath a passenger compartment of the vehicle, preferably between a front and a rear axle of the vehicle. The traction battery can thus be installed in a particularly low-lying region of the vehicle. Due to the typically high weight of the traction battery, the vehicle can also be provided with a low center of gravity, which improves the driving characteristics of the vehicle. When the traction battery is arranged between the front and the rear axles of the vehicle, the vehicle may then also have a central center of gravity in the longitudinal direction.

In one advantageous embodiment, the at least one condensation device is installed in a region above a rear axle of the vehicle, in particular above wheel housings of the rear axle. Due to the installation in this region above the rear axle of the vehicle, a suitable difference in height between the evaporation device and the at least one condensation device can typically be achieved in order to achieve a passive circulation of the fluid in the cooling device. In addition, the installation of the at least one condensation device in this region makes it easy to supply ambient air for cooling the at least one condensation device and for dissipating heat. In particular when driving, a resulting air flow of the ambient air can simply be routed to the at least one condensation device in order to aerate said device and to cool the at least one condensation device in an advantageous manner. The ambient air can, for example, be routed to the at least one condensation device via the wheelhouses. The at least one condensation device is installed as close as possible to the traction battery in this region in the longitudinal direction of the vehicle so that, even if the vehicle inclines, a sufficient difference in height between the evaporation device and the at least one condensation device is ensured. In typical vehicles having the at least one condensation device installed in such a manner, a minimum difference in height between a liquid level of the fluid in the evaporation device in the housing body and the at least one condensation device can still be achieved even with an inclination of 18° so that the function of the cooling device as a thermosiphon is ensured.

In one advantageous embodiment, the at least one condensation device is installed on a region above a front axle of the vehicle, in particular above wheel housings of the front axle, preferably on a windshield-side end of the hood of the vehicle. In this case, too, a suitable difference in height between the evaporation device and the at least one condensation device can typically be achieved by performing the installation in the region above the front axle of the vehicle in order to achieve a passive circulation of the fluid in the cooling device. In addition, the installation of the at least one condensation device in this region makes it easy to supply ambient air for cooling the at least one condensation device and for dissipating heat. In particular when driving, a resulting air flow of the ambient air can be simply routed to the at least one condensation device in order to aerate said device and to cool the at least one condensation device in an advantageous manner, for example through an air intake in the region of the hood, the fenders or also through an air intake on the front air inlet from where the ambient air can be guided to the at least one condensation device. The ambient air can also be guided to the at least one condensation device, for example via the wheelhouses. The at least one condensation device is installed in this region in the longitudinal direction of the vehicle as close as possible to the traction battery so that, even if the vehicle inclines, there is still a sufficient difference in height between the evaporation device and the at least one condensation device. Since it is common for the shape of a vehicle to rise toward the passenger compartment, i.e., toward the windshield, the at least one condensation device can thus be placed at a particularly high point in front of the windshield. The at least one condensation device is preferably arranged directly below the front lid of the vehicle, traditionally referred to as the hood, in order to achieve the greatest possible difference in height to the evaporation device. In typical vehicles having the at least one condensation device installed in such a manner, a minimum difference in height between a liquid level of the fluid in the evaporation device in the housing body and the at least one condensation device can still be achieved even with an inclination of 18° so that the function of the cooling device as a thermosiphon is ensured.

In one advantageous embodiment, a connection line designed as a riser line, which conducts fluid evaporated in the evaporation device to the at least one condensation device, is connected to the housing body in an upper region on a side facing away from the condensation device in the longitudinal direction of the vehicle and in an upper region on a side facing the evaporation device in the longitudinal direction of the vehicle. This arrangement of the riser facilitates the transport of the gaseous fluid from the evaporation device to the at least one condensation device. The riser is preferably arranged so as to be located in an outer portion thereof with respect to a lateral direction of the vehicle, thereby facilitating the design and installation of the riser.

In one advantageous embodiment, a connection line designed as a downcomer, which conducts condensed fluid from the at least one condensation device back to the evaporation device, is connected to the housing body in a lower region on a side facing the condensation device in the longitudinal direction of the vehicle and in a lower region on a side facing away from the evaporation device in the longitudinal direction of the vehicle. This arrangement of the downcomer favors a transport of the liquid fluid from the at least one condensation device to the evaporation device. The downcomer is preferably arranged to be located in an outer region thereof with respect to a lateral direction of the vehicle, thereby facilitating the design and installation of the downcomer.

In one advantageous embodiment, the outlet of the at least one condensation device has at least a minimal difference in height to a side of the housing body facing the condensation device at a maximum vehicle inclination, for example 18° in the longitudinal direction. Accordingly, the function of the cooling device as a thermosiphon is maintained.

Figure 2:
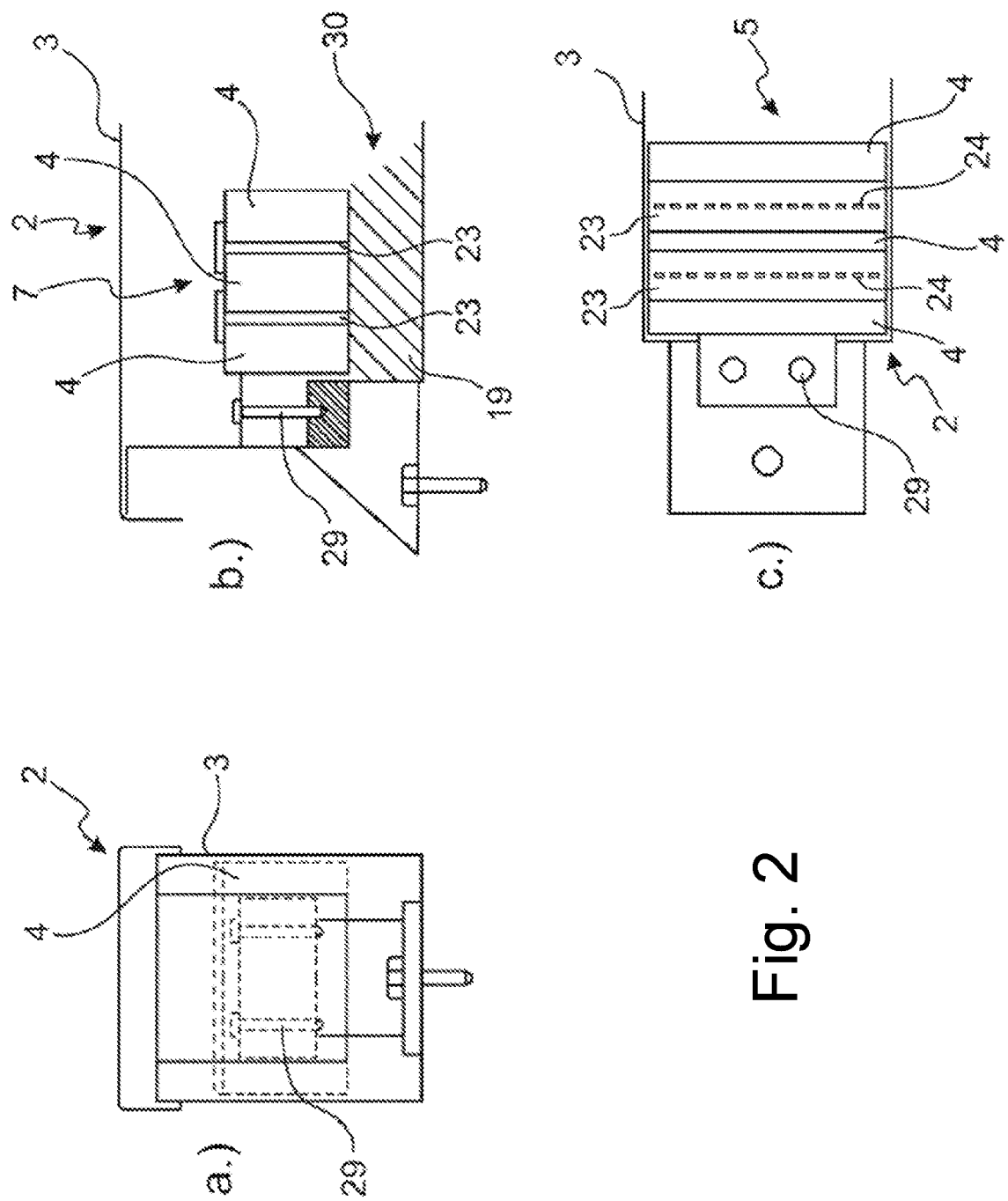
Figure 3:
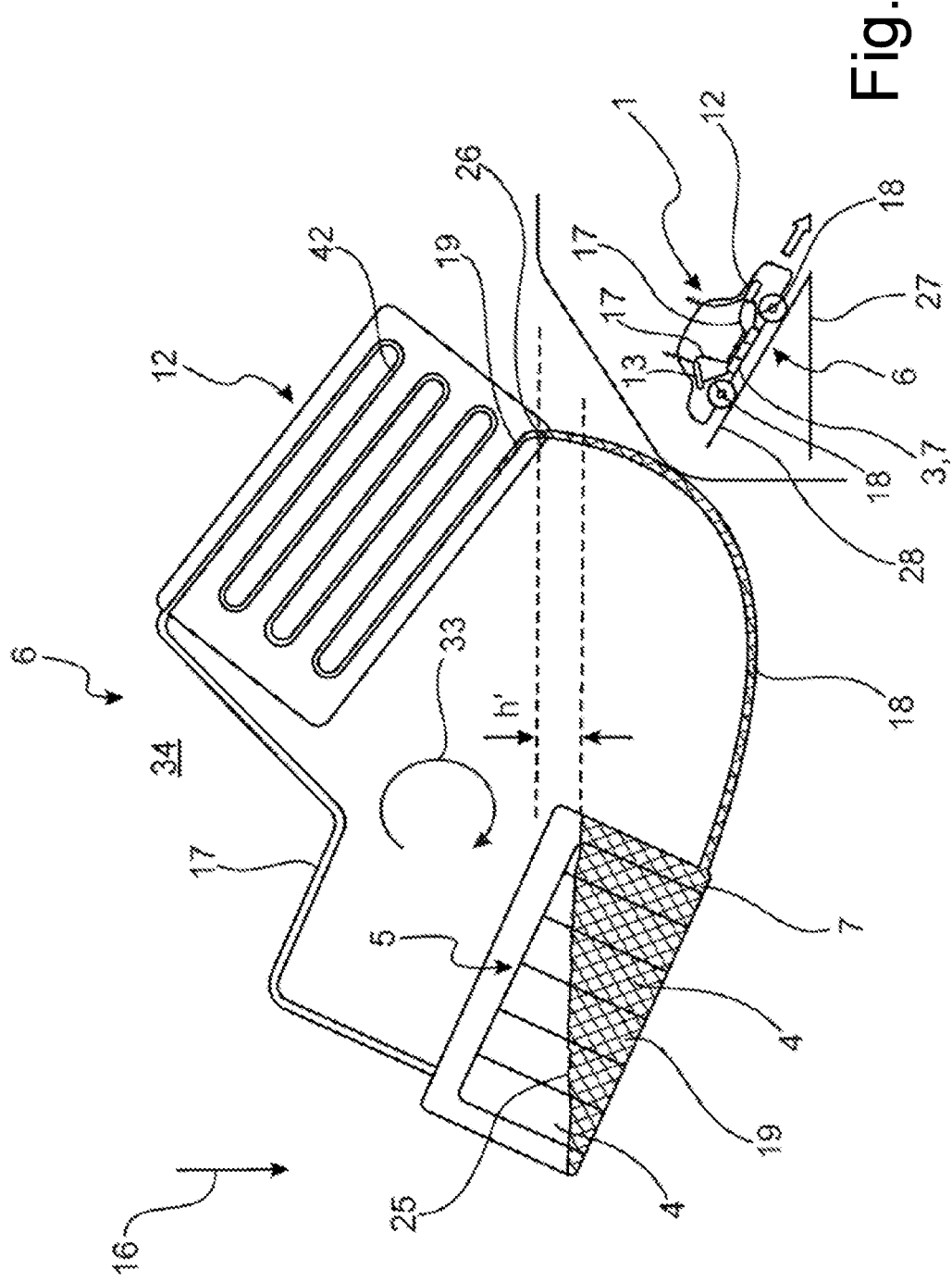
Figure 4:
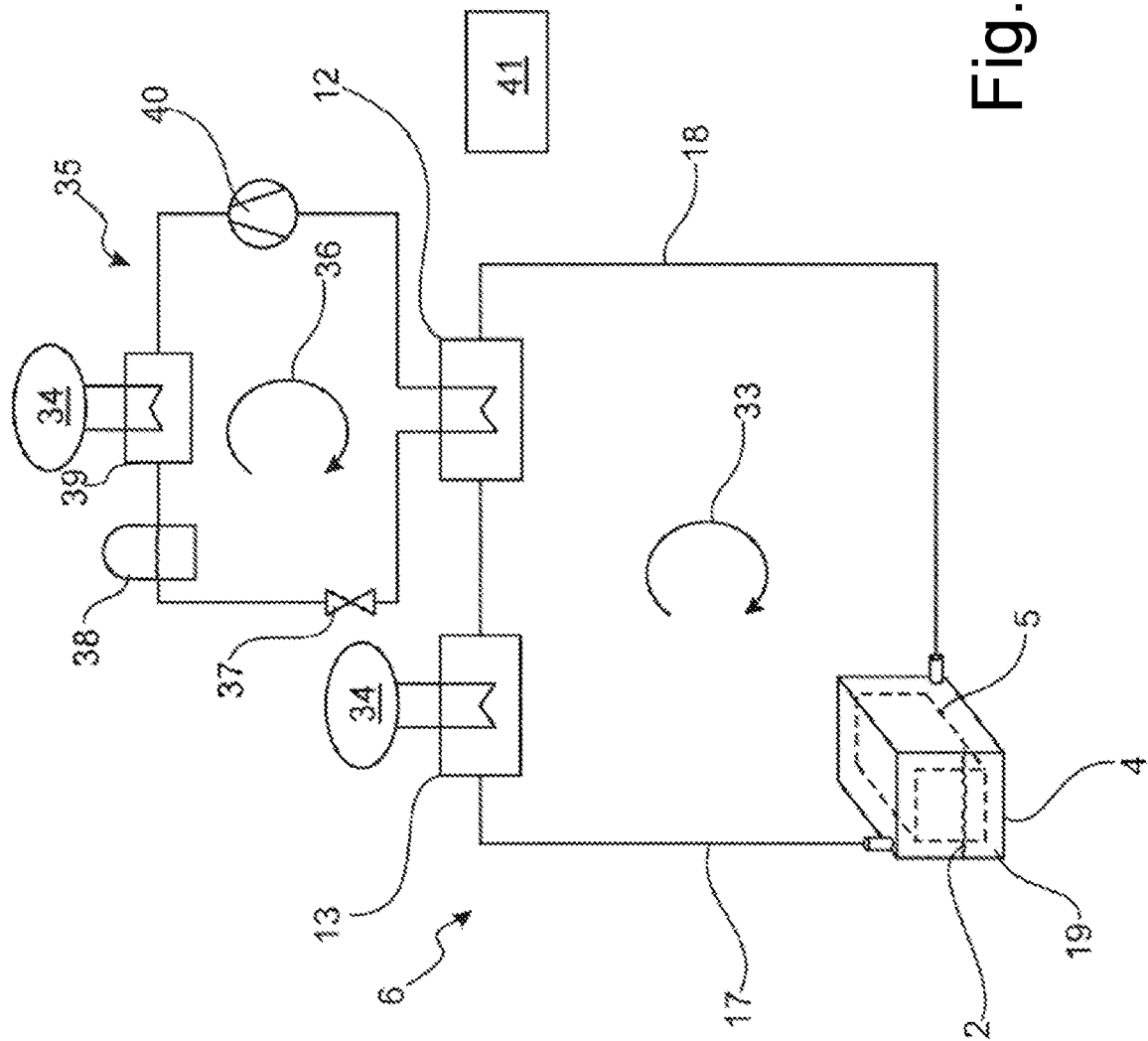
Figure 5:
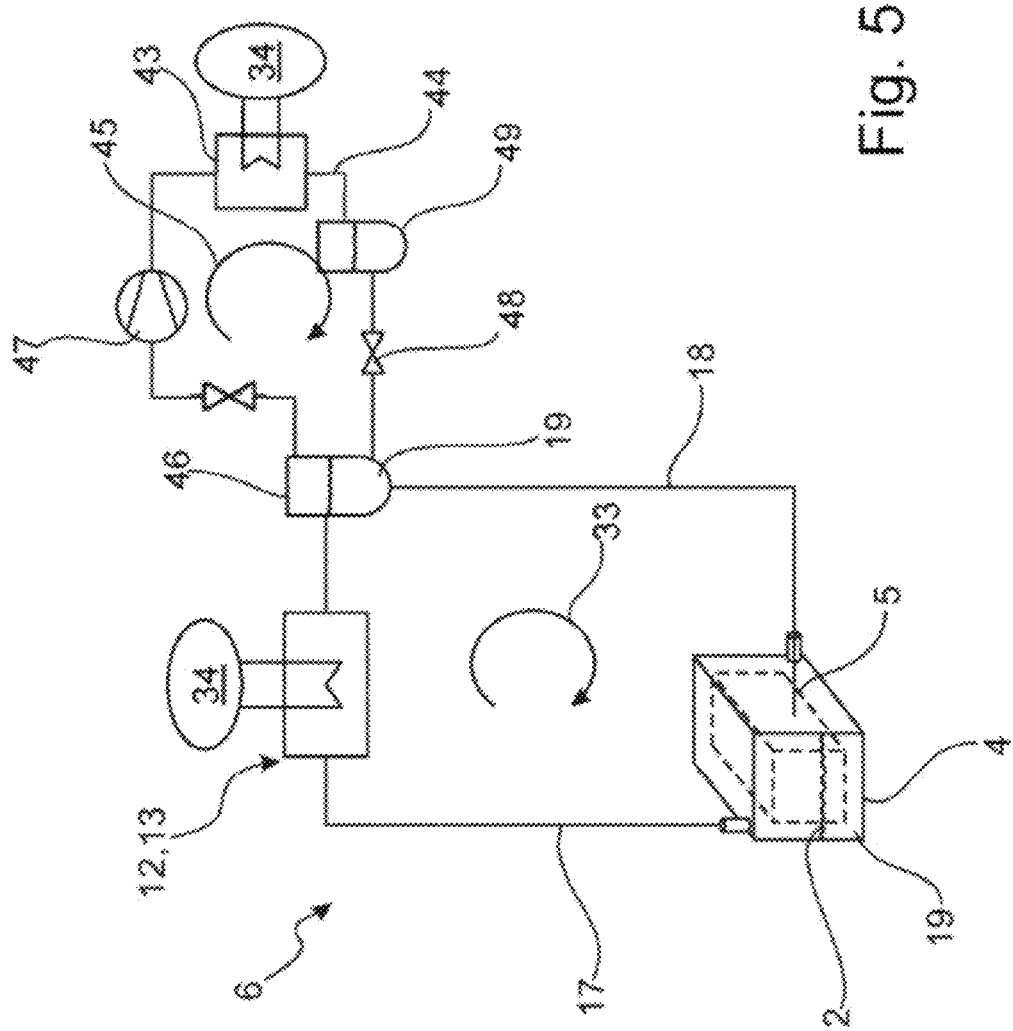
Figure 6:
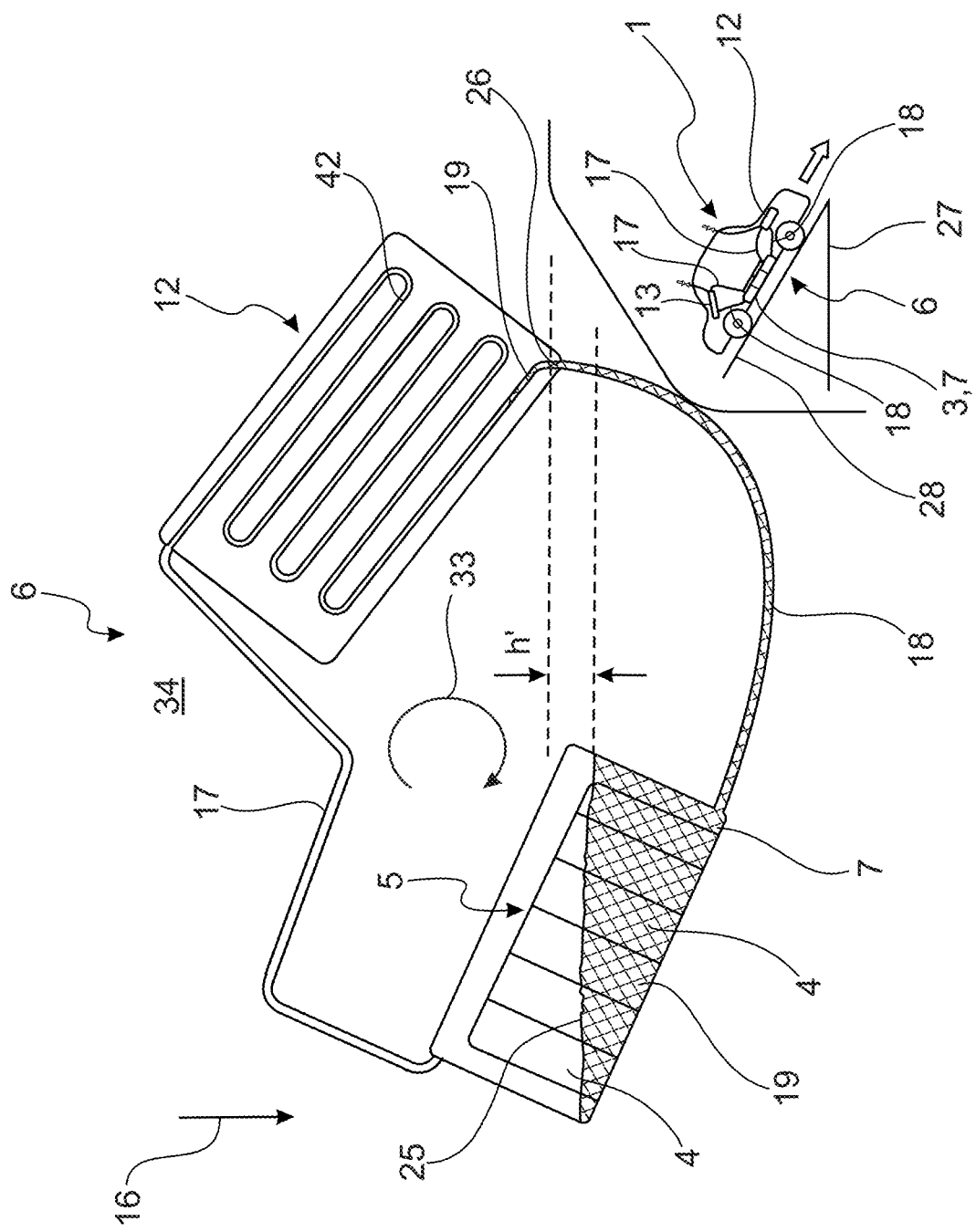
Figure 7:
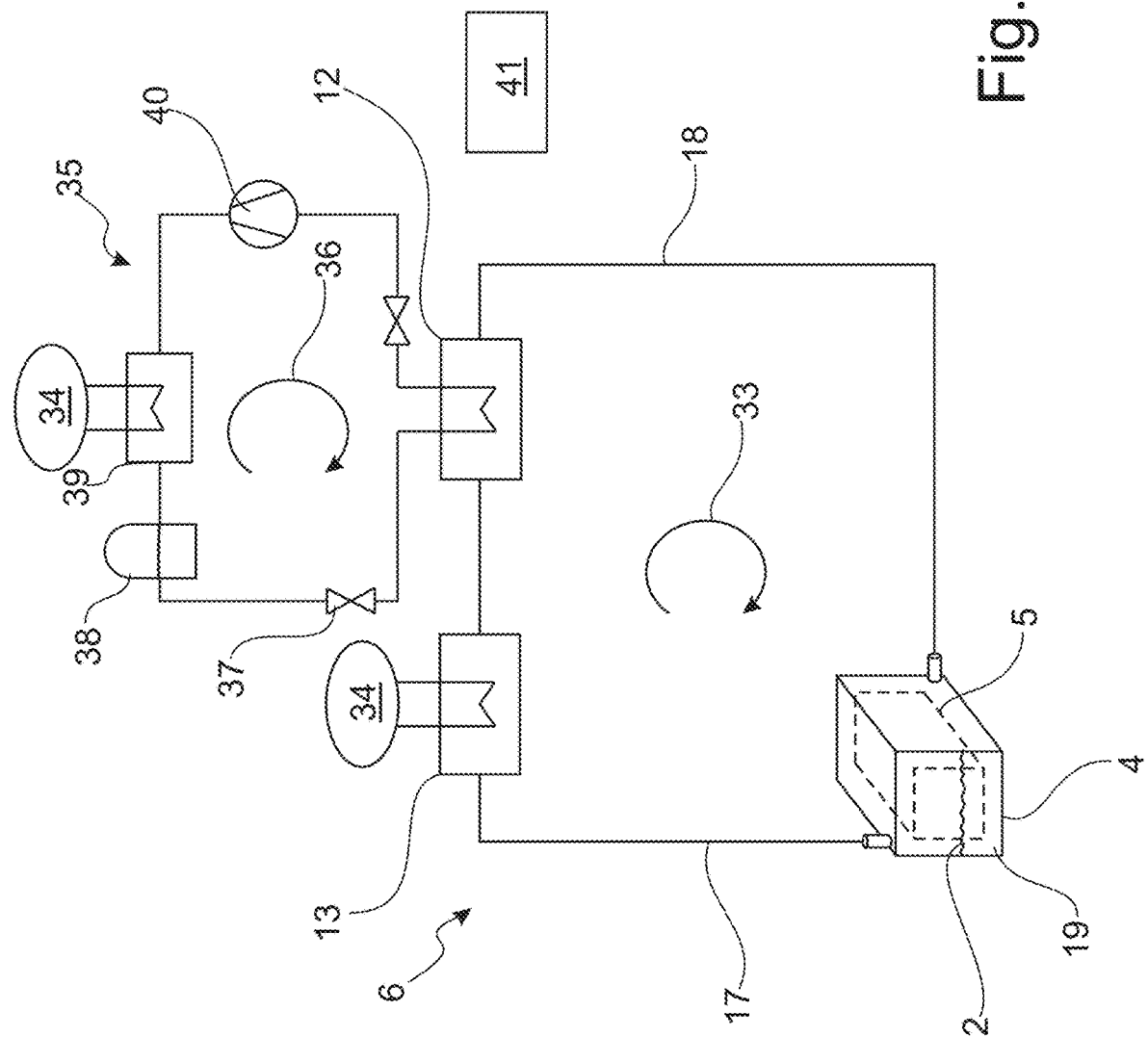

Further advantages, details, and features of the invention can be found below in the described embodiments. The drawings show, in detail, the following:

FIG. 1: a schematic representation of an electrically drivable vehicle with a traction battery and a cooling device according to a first preferred embodiment of the present invention;

FIG. 2: a schematic representation of the traction battery of the vehicle from FIG. 1 with battery cells arranged therein and a cooling device with a plurality of cooling elements in three views;

FIG. 3: a schematic representation of the cooling device of the vehicle from FIG. 1 with an inclination due to a hill and a fluid distribution resulting therefrom;

FIG. 4: a schematic representation of a cooling device according to a second embodiment of the present invention with two condensation devices, wherein one of the condensation devices is designed as a chiller and coupled to an air conditioning system of the vehicle;

FIG. 5: a schematic representation of a cooling device according to a third embodiment of the present invention with a first and a second cooling circuit;

FIG. 6: another schematic representation of the cooling device of the vehicle from FIG. 1 with an inclination due to a hill and a fluid distribution resulting therefrom; and FIG. 7: another schematic representation of a cooling device according to a second embodiment of the instant disclosure with two condensation devices, wherein one of the condensation devices is designed as a chiller and coupled to an air conditioning system of the vehicle.

In the following description, the same reference signs denote the same components or features so that a description of a component with reference to one drawing also applies to the other drawings, thus avoiding repetitive description. Furthermore, individual features which have been described in connection with one embodiment can also be used separately in other embodiments.

FIG. 1 to FIG. 3 relate to an electrically driven vehicle 1 according to a first preferred embodiment of the present invention. The electrically drivable vehicle 1 can be a vehicle 1 with an electric drive only or a so-called hybrid vehicle with an electric drive in combination with a conventional drive, in particular an internal combustion engine.

The vehicle 1 comprises a traction battery 2 for providing electrical energy for the electric drive of the vehicle 1. In this exemplary embodiment, the traction battery 2 is a high-performance battery that can be operated with voltages of up to several hundred volts or even up to 1000 volts and charging and discharging currents of several hundred amperes up to 1000 amperes.

The traction battery 2 comprises a housing body 3 in which a plurality of battery cells 4 is accommodated. The battery cells 4 are, in this embodiment, produced by using lithium-ion technology and work best in a narrow temperature range of, for example, 15° to 40° C. with a great temperature homogeneity and a temperature fluctuation of 2-4° C. within and between the battery cells 4. The battery cells 4 of the first exemplary embodiment are arranged in a plurality of battery modules 5 in the housing body 3, as illustrated in FIG. 1.

The vehicle 1 also comprises a cooling device 6. Parts of the cooling device 6 are shown separately in FIG. 3. The cooling device 6 comprises an evaporation device 7 for installing in the housing body 3. The evaporation device 7 is installed in a floor region 8 of the vehicle 1. The traction battery 2 with its housing body 3 and the evaporation device 7 installed therein is arranged underneath a passenger compartment 9 of the vehicle 1, specifically between a front and a rear axle 10, 11 of the vehicle 1. The evaporation device 7 comprises a plurality of evaporation elements 23 which are each arranged individually between two battery cells 4, as illustrated in FIG. 2. Therefore, the evaporation elements 23 are made of an electrically nonconductive material. The corresponding battery modules 5 therefore also include the evaporation elements 23 in addition to the battery cells 4. The battery modules 5 are fastened to the housing body 3 with screw means 29.

Microchannel structures are formed in the evaporation elements 23 which are at least partially open in the lateral direction. The contact of the evaporation elements 23 with the adjacent battery cells 4 closes the microchannel structures laterally, as a result of which microchannels 24 are formed in the evaporation elements 23. The microchannels 24 extend in the vertical direction 16 and are open at both of their ends.

The evaporation device 7 is installed in the housing body 3 of the traction battery 2 as a separate component. Alternatively, the evaporation device 7 can form an integral part of the base body 3.

The cooling device 6 further comprises two condensation devices 12, 13 which are installed outside of the housing body 3 of the traction battery 2. Specifically, the two condensation devices 12, 13 are installed on the vehicle 1 in a distributed manner. A front condensation device 12 is positioned in the longitudinal direction 14 of the vehicle 1 in front of the traction battery 3 together with the evaporation device 7, while a rear condensation device 13 is positioned in the longitudinal direction 11 of the vehicle 1 behind the traction battery 3 together with the evaporation device 7.

The front condensation device 12 is attached to a windshield-side end of the hood 15 of the vehicle 1 in a region above wheel housings of the front axle 10 of the vehicle 1. The front condensation device 12 is installed in this region in the longitudinal direction 14 of the vehicle 1 close to the traction battery 3. The front condensation device 12 is arranged directly below the hood 15.

In addition, the rear condensation device 13 is installed in a region above wheelhouses of the rear axle 11 of the vehicle 1, wherein the rear condensation device 13 is installed in this region close to the traction battery 3 in the longitudinal direction 14 of the vehicle 1. A difference in height h results, which is shown as an example for the rear condensation device 13 in FIG. 1.

As shown in FIG. 1, the evaporation device 7 is arranged in a vertical direction 16 with the difference in height h below the two condensation devices 12, 13.

Connection lines 17, 18, which form a fluid connection, are arranged between the evaporation device 7 and the two condensation devices 12, 13. The connection lines 17, 18 comprise a riser 17 and a downcomer 18 arranged between the evaporation device 7 and each of the two condensation devices 12, 13. This results in a parallel connection of the two condensation devices 12, 13 with the evaporation device 7.

The risers 17 are each connected with the corresponding condensation device 12, 13 in an upper region on a side facing away from the condensation device 12, 13 in the longitudinal direction 14 of the vehicle 1 and in an upper region on a side facing the evaporation device 7 or the housing body 3 in the longitudinal direction 14 of the vehicle 1. In this embodiment, for example, the risers 17 are arranged in such a way that they are, relative to a lateral direction of the vehicle 1, arranged in an outer region thereof.

The downcomers 18 are connected with the corresponding condensation device 12, 13 in a lower region on a side facing the condensation device 12, 13 in the longitudinal direction 14 of the vehicle 1 and in a lower region on a side facing away from the evaporation device 7 or the housing body 3 in the longitudinal direction 14 of the vehicle 1. In this embodiment, for example, the downcomers 18 are arranged in such a way that they are, relative to a lateral direction of the vehicle 1, arranged in an outer region thereof.

A fluid 19 is accommodated in the cooling device 6, as shown in FIG. 2 and FIG. 3. In this exemplary embodiment, the fluid 19 has a boiling temperature in a range between 10° C. and 80° C. at ambient pressure. The fluid 19 preferably has a boiling temperature below a maximum operating temperature of the battery cell 4 of the traction battery 2. The fluid 19 is here a dielectric fluid 19 which is not electrically conductive. The fluid 19 is collected in the liquid state in a plenum 30 in the housing body 3 of the traction battery 2, as shown in FIG. 2.

The two condensation devices 12, 13 each have a pressure equalization device 20 to equalize the pressure between an interior 42 of the cooling device 6 and an external environment 34. As shown in FIG. 1, the two pressure equalization devices 20 are each designed in the manner of a chimney with the pressure equalization opening 21 on its upper end and a pressure equalization valve 22 below it. The pressure compensation device 20 is arranged and accommodated in an A pillar 31 in the front condensation device 12 and in a C pillar 32 in the rear condensation device 13 of the vehicle 1, i.e., at the front and rear ends of the passenger compartment 9.

An aeration gas, which is ambient air in this exemplary embodiment, can be brought in via the pressure equalization opening 21 (inflow ventilation), and/or a ventilation gas can be discharged from the cooling device 6 (outflow ventilation). The pressure compensation valve 22 opens when the pressure in the cooling device 6 falls below a pressure limit, for example below 0.8 bar. In this case, the inflowing ventilation gas is dried via the pressure compensation device 20, for example via an exchangeable drying cartridge, which is not shown separately here. Air can be removed from the cooling device 6 via the two pressure compensation devices 20.

During the ventilation, a material separation of the gaseous fluid 19 and the aeration gas taken up during a previous aeration takes place in the two pressure equalization devices 20. The separation takes place on the one hand due to a difference in density between the gaseous fluid 19 and the aeration gas, i.e., the previously absorbed ambient air, over the length of the two pressure equalization devices 20.

Alternatively or additionally, a filter device which retains gaseous fluid 19 during the ventilation process, for example as an activated carbon filter, can be arranged in the pressure compensation device 20. The activated charcoal filter is preferably discharged again during operation by actively supplying heat, as a result of which the fluid 19 contained therein is recovered. Alternatively or additionally, the filter device can have a zeolite material, a filter membrane, or a chemical filter. The filter device is not shown individually in the figures.

Alternatively or additionally, the pressure equalization devices 20 can be actively cooled during the ventilation process so that the gaseous fluid 19 contained in the gas rising in the pressure equalization devices 20 is condensed and only the remaining gas, ideally only previously absorbed aeration gas, escapes. The condensed fluid 19 can then be returned in the liquid state from the pressure equalization device 20 to the respective condensation device 12, 13 based on its gravity.

A first cooling circuit 33 for cooling the battery cells 4 of the traction battery 2, which occurs in the cooling device 3 during operation, is described below. The first cooling circuit 33 in the cooling device 6 is shown in FIG. 3.

Heat is generated during operation, i.e., when charging or discharging the traction battery 2. This heat is transferred from the battery cells 4 to the liquid fluid 19 by means of the evaporation device 7. In this embodiment, the evaporation device 7 is designed as an immersion evaporator. The microchannels 24 are in fluid contact with the plenum 30. As a result, liquid fluid 19 penetrates into the microchannels 24 where it is heated by the heat provided by the battery cells 4. When the heat is absorbed by the battery cells 4 of the traction battery 2, the liquid fluid 19 evaporates in the evaporation device 7. In the process, liquid fluid 19 is entrained and wets the microchannels 24 on the inside. After the wetting, heat can be transferred along the entire length of the microchannels 24 and very efficient cooling can be achieved. Alternatively, the battery cells 4 and the evaporation elements 23 can be partially immersed in the liquid fluid 19 in the housing body 3 of the traction battery 2 so that the microchannels 24 are partially filled with liquid fluid 19. Liquid fluid 19 can flow out of the plenum 30 into the microchannels 24 as well.

The evaporation device 7 is therefore a heat transfer unit or a heat exchanger in which heat is transferred from the battery cells 4 to the liquid fluid 19 so that it evaporates. Accordingly, such an evaporation device 7 is also known as an evaporator. Due to its low density, the gaseous fluid 19 rises in the risers 17 to the two condensation devices 12, 13.

The two condensation devices 12, 13 are heat exchangers as well which absorb heat from the gaseous fluid 19 and give it off to an environment so that the gaseous fluid 19 condenses. Such a condensation device 12, 13 is also known as a vapor condenser or liquefier.

The condensed fluid 19 can flow back through the downcomer 18 from the respective condensation device 12, 13 to the evaporation device 7. In this case, the liquid fluid 19 is transported solely as a result of gravity, which is why the liquid fluid 19 flows back into the housing body 3, where it is again made available to the evaporation device 7.

In this embodiment, the first cooling circuit 33 is designed in the manner of a natural circulation without an active circulation of the fluid 19. Accordingly, the evaporated fluid 19 is passively transported in the cooling device 6 from the evaporation device 7 to the condensation devices 12, 13 and the condensed fluid 19 is passively transported from the condensation devices 12, 13 to the evaporation device 7, as described above. The cooling device 6 is thus designed in the manner of a thermosiphon. Thus, the thermosiphon is a passive structure as well that allows for a heat exchange by utilizing natural convection in a vertical fluid circuit between the evaporation device 7 and the condensation devices 12,13. The function of the thermosiphon is based on the difference in density between the liquid and the gaseous phase of the fluid 19 wherein the gaseous fluid 19 flows or rises in the risers 17 to the condensation devices 12, 13 due to its low density and the condensed fluid 19, driven by gravity, flows back or sinks from the condensation devices 12, 13 through the downcomer 18 into the evaporation device 7. The liquid fluid 19 can flow back or sink into the housing body 3 of the traction battery 2, where the plenum 30 is formed from liquid fluid 19 in order to enter the evaporation device 7 from there.

In the thermosiphon, when the vapor-filled risers 17 and liquid-filled downcomers 18 are arranged vertically at the bottom of the conduits 17, 18 connected to the evaporation device 7, different pressures prevail due to the different densities of the corresponding vapor and liquid columns. During the evaporation and further heating of the fluid 19 in the evaporation device 7, the concentration of the gaseous fluid 19 increases. A pressure equalization is created between the risers 17 and the downcomers 18 in that liquid fluid 19 flows from the downcomers 18 into the evaporation device 7 and thus in the direction of the vapor column in the risers 17 and gaseous fluid 19 is displaced into the risers 17. The gaseous fluid 19 flows out of the risers 17 into the condensation devices 12, 13, where it condenses again, so that the first cooling circuit 33 is closed.

Due to a continuous evaporation of the liquid fluid 19 at the bottom of the risers 17, i.e., in the evaporation device 7, and a condensation of the gaseous fluid 19 at the top end of the risers 17, i.e., in the condensation devices 12, 13, as well as the subsequent return of the condensed fluid 19 from the condensation devices 12, 13 to the downcomers 18, a continuous circuit of the fluid 19 is formed in the cooling device 6 in the manner of the thermosiphon and a dynamic circulation in the cooling device 6 is generated. An active circulation of the fluid 19 by a pump or a compressor is not required.

As described above, the cooling device 6 forms a two-phase cooling system, wherein the liquid fluid 19 absorbs heat from the battery cells 4 in the evaporation device 7 so that it evaporates and emits heat to the environment 34 in the two condensation devices 12, 13 of the vehicle 1, which causes the gaseous fluid 19 to condense again. During the circulation in the first cooling circuit 33, the liquid fluid 19 absorbs evaporation heat during the evaporation process and releases it again when condensing from its gaseous state in the two condensation devices 12, 13. The evaporation heat can thus be dissipated from the battery cells 4 of the traction battery 2 and given off to the external environment 34.

The cooling device 6 formed in this manner can ensure reliable operation which is not impaired even when the vehicle 1 significantly inclines, as can be seen from FIG. 1 and FIG. 3. In typical vehicles 1 with the cooling device 6 of the first exemplary embodiment, even with an inclination of 18°, for example, a difference in height h' between a liquid level 25 of the fluid 19 in the evaporation device 7 in the housing body 3 and the condensation devices 12, 13, in particular an outlet 26 of the condensation devices 12, 13 for condensed fluid 19, can still be maintained, as illustrated in FIG. 1 and FIG. 3. These figures show a normal position 27 of the vehicle 1 together with additionally inclined positions 28 of +18° or −18° compared to the normal position 27. As shown in FIG. 3, the outlet 26 of the front condensation device 12 for condensed fluid 19 is located at said vehicle inclination with a difference in height h' above the liquid level 25 of the liquid fluid 19 in the housing body 3 of the traction battery 2 and allows the condensed fluid 19, driven by gravity, to flow into the housing body 3.

FIG. 4 shows a cooling device 6 of an electrically driven vehicle 1 according to a second embodiment of the present invention. The cooling device 6 of the second embodiment largely corresponds to the cooling device 6 of the first embodiment so that only the differences between the two cooling devices 6 are discussed below.

The cooling device 6 of the second embodiment differs from the cooling device 6 of the first embodiment in that one of the two condensation devices 12, 13, here by way of example the front condensation device 12, is designed as a chiller for coupling to an air conditioning system 35 of the vehicle 1. The chiller serves as a controllable heat sink depending on the operation of the air conditioning system 35 of the vehicle 1. The air conditioning system 35 includes an air conditioning circuit 36 with a separate refrigerant. In the air conditioning circuit 36, a throttle valve 37, a collector 38, an air conditioning condensation device 39 for dissipating heat to the environment 34 and an air conditioning compressor 40 are arranged.

In the embodiment shown in FIG. 4, the two condensation devices 12, 13 are connected downstream of one another. Alternatively, the two condensation devices 12, 13 can be connected to the evaporation device 7 in parallel, as described above in relation to the first embodiment.

In a further alternative embodiment, both condensation devices 12, 13 are designed as chillers for coupling to the air conditioning system 35 of the vehicle 1.

The cooling device 6 also has a control device 41 which is designed to detect an impending load on the traction battery 2, in particular during rapid charging, and which is also designed to pre-cool the traction battery 2 and/or the fluid 19 with the cooling device 6 when an imminent load is detected. Control can be exercised, for example, by activating the air conditioning system 35 of the vehicle 1. In addition, the control device 41 can carry out a suitable control of the ventilation valves 22 in order to actively carry out a pressure equalization between an interior space 42 of the cooling device 6 and the environment 34. Alternatively or additionally, the control device 41 can supply an increased quantity of ambient air to the outside of the other condensation device 12, 13 via a fan (not shown here).

FIG. 5 shows a cooling device 6 of an electrically driven vehicle 1 according to a third embodiment of the present invention. The cooling device 6 of the third embodiment largely corresponds to the cooling device 6 of the first embodiment, so that only the differences between the two cooling devices 6 are discussed below.

The cooling device 6 of the third embodiment differs from the cooling device 6 of the first embodiment in that the cooling device 6 has a further condensation device 43 and further connection line 44 to form a second cooling circuit 45, as shown in FIG. 5. The two cooling circuits 33, 45 are connected to one another via a collector 46 for collecting liquid fluid 19; i.e., the collector 46 is arranged at a connection between the first cooling circuit 33 and the second cooling circuit 45.

The second cooling circuit 45 has a compressor as a circulation device 47 for conveying the fluid 19 and for increasing the pressure. In addition, an adjustment throttle 48 is provided in the second cooling circuit 45 for adjusting a pressure level. Finally, the second cooling circuit 45 also includes a collection container 49.

In FIG. 5, the two condensation devices 12, 13 are shown together. The two condensation devices 12, 13 are preferably connected to the evaporation device 7 in parallel. In FIG. 5, the two condensation devices 12, 13 and the collector 46 are connected downstream of one another. Alternatively, the two condensation devices 12, 13 and the collector 46 can be connected in parallel to the evaporation device 7, as described above in relation to the arrangement of the two condensation devices 12, 13 of the first embodiment.

FIG. 6 shows a representation of the cooling device of the vehicle like that of FIG. 3, with an additional valve for separation from or connection to the first cooling circuit FIG. 7 shows the riser connected to the evaporation device, like that of FIG. 4, but where the riser is connected to a side of the evaporation device rather that is a side facing away from the corresponding condensation device in a longitudinal direction of the vehicle.

LIST OF REFERENCE SIGNS

1. Vehicle
2. Traction battery
3. Housing body
4. Battery cell
5. Battery module
6. Cooling device
7. Evaporation device
8. Floor region
9. Passenger compartment
10. Front axle
11. Rear axle
12. Front condensation device
13. Rear condensation device
14. Longitudinal direction
15. Engine hood
16. Vertical direction
17. Riser, connection line
18. Downcomer, connection line
19. Fluid
20. Ventilation device
21. Ventilation opening
22. Ventilation valve
23. Evaporation element
24. Microchannel
25. Fluid level
26. Outlet
27. Normal position
28. Inclined position
29. Screw means
30. Plenum
31. A Pillar
32. C Pillar
33. First cooling circuit
34. Environment
35. Air conditioning
36. Air conditioning cycle 37. Throttle valve
38. Collector
39. Air conditioning condensation device
40. Air conditioning compressor
41. Control device
42. Interior
43. Further condensation device
44. Further connection lines
45. Second cooling circuit
46. Collector
47. Circulation device, compressor
48. Single throttle
49. Collection container
h Difference in height without vehicle inclination
h' Difference in height with vehicle inclination

The invention claimed is:
1. A cooling device for cooling a traction battery of a vehicle via a fluid, the cooling device comprising:
   an evaporation device for installing in a housing body of the traction battery,
   at least one condensation device for installing on the vehicle outside of the housing body of the traction battery, and
   connection lines which conduct fluid evaporated in the evaporation device to the at least one condensation device and condensed fluid from the at least one condensation device back to the evaporation device,
   wherein the evaporation device, the at least one condensation device and the connection lines form a first cooling circuit,
   wherein said first cooling circuit causes a natural circulation, with circulation of the fluid through the first cooling circuit including a process of transporting gaseous fluid from the evaporation device to the at least one condensation device and of liquid fluid from the at least one condensation device back to the evaporation device and, during circulation, the circulation is based on:
      a difference in density between the evaporated fluid and the liquid fluid condensed in the at least one condensation device, and
      a difference in height of the at least one condensation device and the evaporation device,
   wherein the evaporation device is configured as an immersion evaporator and comprises at least one evaporation element, in which:
      microchannels are formed in the at least one evaporation element, or
      the at least one evaporation element comprises microchannel structures for forming microchannels together with battery cells of the traction battery, or
      microchannel structures are formed between a plurality of evaporation elements to form microchannels between the evaporation elements and together with the battery cells of the traction battery,
   wherein the evaporation elements are arranged in such a way that the liquid fluid evaporates in the microchannels while absorbing heat from the battery cells, and
   wherein the microchannels are adapted so that the liquid fluid is entrained by the evaporation of the fluid in the microchannels so that the microchannels are wetted inside.
2. The cooling device according to claim 1, wherein the evaporation device is arranged in a vertical direction below the at least one condensation device.
3. The cooling device according to claim 1, wherein:
   the first cooling circuit comprises a plurality of condensation devices, and
   the plurality of condensation devices is configured for a distributed installation on the vehicle in a longitudinal direction of the vehicle in front of and behind the evaporation device.
4. The cooling device according to claim 1, wherein the at least one condensation device is configured as a chiller for coupling to an air conditioning system of the vehicle in order to dissipate heat from the first cooling circuit via the air conditioning system.
5. The cooling device according to claim 1, wherein:
   the cooling device comprises a further condensation device and further connection line to form a second cooling circuit, and
   the second cooling circuit comprises a circulation device for conveying the fluid in the second cooling circuit.
6. The cooling device according to claim 5, wherein the second cooling circuit comprises at least one valve device for fluidic separation from or connection to the first cooling circuit.
7. The cooling device according to claim 5, wherein the cooling device has a collector for collecting the liquid fluid, and
   wherein the collector is arranged at a connection between the first cooling circuit and the second cooling circuit.
8. The cooling device according to claim 1, wherein the cooling device comprises a control device configured to:
   detect an impending load on the traction battery during rapid charging, and
   pre-cool the traction battery and/or the fluid with the cooling device when an imminent load is detected.
9. The cooling device according to claim 1, wherein the at least one condensation device comprises a pressure compensation device for pressure compensation between an interior of the cooling device and an external environment.
10. The cooling device according to claim 1, wherein the vehicle is an electrically drivable vehicle with the traction battery and the cooling device is implemented in the vehicle, and
   wherein:
      the traction battery with its housing body and the evaporation device installed therein is installed in a floor region of the vehicle,
      the at least one condensation device is installed outside of the traction battery in a region above the evaporation device, and
      a fluid is accommodated in the cooling device.
11. The cooling device according to claim 10, wherein the traction battery with the housing body and the evaporation device installed therein is arranged underneath a passenger compartment of the vehicle, between a front and a rear axle of the vehicle.
12. The cooling device according to claim 10, wherein the at least one condensation device is installed in a region above a rear axle of the vehicle above wheel housings of the rear axle.
13. The cooling device according to claim 10, wherein the at least one condensation device is installed in a region above a front axle of the vehicle above wheel housings of the front axle, at an end of a hood of the vehicle on a windshield side.
14. The cooling device according to claim 10, wherein a connection line configured as a riser, which conducts fluid evaporated in the evaporation device to the at least one condensation device to the evaporation device, is connected to a corresponding condensation device of the at least one condensation device in an upper region on a side facing away from the corresponding condensation device in a longitudinal direction of the vehicle and in an upper region on a side facing the evaporation device in the longitudinal direction of the vehicle.

15. The cooling device according to claim 10, wherein a connection line configured as a downcomer, which returns condensed fluid from the at least one condensation device to the evaporation device, is connected to a corresponding condensation device of the at least one condensation device in a lower region on a side facing the corresponding condensation device in a longitudinal direction of the vehicle and in a lower region on a side facing away from the evaporation device in the longitudinal direction of the vehicle.

16. The cooling device according to claim 15, an outlet of the at least one condensation device has at least a minimum difference in height (h') to a side of the housing body facing away from the corresponding condensation device at a maximum vehicle inclination of 18° in the longitudinal direction.

* * * * *